United States Patent [19]

Harder

[11] Patent Number: 4,567,007
[45] Date of Patent: Jan. 28, 1986

[54] METHOD OF MAKING CARBON/CARBON COMPOSITES

[75] Inventor: Isaac E. Harder, Grand Prairie, Tex.

[73] Assignee: LTV Aerospace and Defense Company, Dallas, Tex.

[21] Appl. No.: 182,570

[22] Filed: Aug. 29, 1980

[51] Int. Cl.$^4$ .......................... B32B 9/00; B32B 31/20
[52] U.S. Cl. .................................... 264/29.5; 264/313; 427/228
[58] Field of Search ..................... 264/29.2, 29.5, 29.6, 264/29.7, 313; 423/447.7, 447.8; 427/228

[56] References Cited

U.S. PATENT DOCUMENTS

| | | | |
|---|---|---|---|
| 3,416,944 | 12/1968 | Pirrung et al. | 427/228 |
| 3,917,884 | 11/1975 | Jahn | 427/228 |
| 4,100,322 | 7/1978 | Seibold et al. | 264/29.5 X |
| 4,166,145 | 8/1979 | Hatch et al. | 264/29.5 X |
| 4,409,048 | 10/1983 | Hatch et al. | 264/29.5 |

*Primary Examiner*—Edward A. Miller
*Attorney, Agent, or Firm*—James M. Cate; Stephen S. Sadacca

[57] ABSTRACT

Disclosed is a method of making carbon/carbon composites by pyrolytic conversion of a carbonizable liquid in a pre-formed graphite body to form an amorphous carbon reinforcing matrix. Graphite fabric saturated with a carbonizable liquid is formed into the shape of the desired end product body and placed in a flexible bag. The bag is evacuated to compress the formed body and the bagged body subjected to external pressure and heated. When the carbonizable liquid is heated to the curing temperature, the external pressure is reduced, causing volatile materials in the liquid to expand and form an interconnected pore structure. The formed body is thereafter heated to a temperature in excess of the curing temperature to further remove volatile materials therefrom. The cured rigid body is then transferred to a pyrolyzing furnace and rapidly heated in an inert gaseous environment directly to about 1500° F. to pyrolyze the carbonizable material and form an amorphous carbon matrix.

21 Claims, No Drawings

METHOD OF MAKING CARBON/CARBON COMPOSITES

DESCRIPTION

1. Technical Field

This invention relates to methods of making carbon-reinforced composite bodies. More particularly, it relates to methods of forming a pyrolytic carbon reinforcing matrix in a shaped article of graphite fabric to form a dense carbon/carbon composite body of carbon-reinforced graphite.

2. Background Art

Because of its unique physical and chemical properties, carbon (in the form of bodies of amorphous carbon, graphite or composites thereof) has become widely used in modern industry, particularly in the aerospace industry. Where shaped carbon bodies are used particularly because of their high strength and resistance to wear, thermal shock, high temperatures and corrosion (such as in leading edges for atmospheric re-entry vehicles, rocket engine nozzles, etc.) a carbon/carbon composite is often preferred. Such carbon/carbon composites comprise shaped bodies formed by pyrolytic decomposition of carbonizable precursers in a pre-formed shaped article of graphite fabric wherein the pyrolytic carbon forms a matrix reinforcing the graphite fabric to form a relatively dense, carbon-reinforced composite. Such carbon-reinforced bodies are conventionally formed by (a) forming a plurality of layers of graphite fabric impregnated with a carbonizable liquid precurser into the desired shape of the article to be produced; (b) pre-curing the shaped article by slowly heating the pre-formed article to remove volatiles from the carbonizable liquid and form a cured solid body; (c) post-curing the pre-formed article by slowly heating it to a higher temperature and thereby degrading the carbonizable material in preparation for pyrolyzation; and (d) heating the post-cured pre-formed article to a temperature of about 1500° F. to pyrolyze the carbonizable material and form a rigid matrix of amorphous carbon reinforcing the graphite.

Since the carbonizable material is reduced to amorphous carbon by pyrolysis, gaseous materials are evolved during the entire process and the matrix of amorphous carbon formed is porous. Therefore, to increase the density of the final product, the porous carbon/carbon composite body may be impregnated with more carbonizable liquid and steps (b) through (d) repeated. Because of the volatile content of the liquid carbonizable material, the pre-cure and post-cure steps must be effected extremely slowly to permit gas evolution from the liquid without causing the liquid to froth, foam or otherwise expand sufficiently rapidly to destroy the integrity of the body. If the body is heated too rapidly during the pre-cure step, rapid evolution of volatiles causes foaming of the carbonizable material and swelling, distortion and delamination of the pre-formed shaped article. Similarly, heating of the shaped article during the post-cure step must be carefully controlled to prevent such rapid evolution of gas or the formation of thermally-induced stresses which would cause fracturing of the cured article.

The rates of temperature increase during both the pre-cure and post-cure steps are dependent, of course, on such variables as the volatile content of the carbonizable material and the physical size of the shaped body. For example, with a shaped body consisting of eighteen to twenty plies of graphite fabric saturated with phenolic resin, the pre-cure step conventionally comprises hearing the shaped article gradually from room temperature to about 300° F. over a period of several hours. The post-cure step involves heating the cured body gradually to a temperature of about 500° F. over a period of seven days or longer.

Conventionally, conversion of the post-cured body to carbon is accomplished by packing the pre-formed post-cured body in calcined coke and then heating the body to a temperature of about 1500° F. The body is heated slowly to this temperature over a period of about ninety-six hours to fully pyrolize the resin.

It will be apparent from the foregoing that the conventional process for forming carbon/carbon composite structures is extremely time-consuming and quite expensive in terms of equipment, man-power and energy consumed. Furthermore, since each re-impregnation of the initial composite body to increase the final density thereof requires repetition of steps (b) through (d), the improvement in density rapidly approaches a point of diminishing returns because of the extremely expensive and time-consuming process steps involved.

DISCLOSURE OF THE INVENTION

In accordance with the present invention, carbon/carbon composite structures are formed by a unique process which totally eliminates the time-consuming and energy-intensive post-cure step and substantially reduces the time and energy required for the final pyrolysis carbonization step. The process includes a multiphase pre-cure step in which the pre-formed article is maintained under pressure during the initial pre-cure step and the pressure reduced during the final pre-cure step. In the final pre-cure step the temperature is increased sufficiently to cure the carbonizable material and form a rigid body which can be pyrolyzed directly without further post-cure treatment.

By subjecting the workpiece to a substantially high environmental pressure during the initial pre-cure step, controlled evolution of volatiles is effected at a rapid rate without causing bubbling or foaming. By reducing the environmental pressure (but retaining a pressure greater than atmospheric) while the precurser is still in the liquid state, the voids formed in the precurser by gas evolution are expanded and substantially interconnected while the precurser is in the form of a highly viscous or gel-like material. Thus, gas may be rapidly evolved therefrom without destroying the structural integrity of the pre-formed body. By causing the pores to become interconnected and by heating the body past the conventional pre-cure temperature in the pre-cure step, sufficient gas is evolved and the body is sufficiently cured to form a substantially rigid body which may then be directly heated to carbonizing temperatures without structural degradation. Accordingly, the post-cure step is totally eliminated. Furthermore, since the void structures in the body are substantially interconnected, gas evolution is enhanced and the porous body may be rapidly heated directly to carbonizing temperatures, thus substantially reducing the time and energy required to carbonize the precurser. Other features and advantages of the invention will become more readily understood from the following detailed description taken in connection with the appended claims.

BEST MODE FOR CARRYING OUT THE INVENTION

Since the invention relates generally to pyrolytic decomposition of a carbonizable precurser in shaped articles of graphite fabric, it will be readily recognized that a wide variety of precursers may be employed. For example, any organic material which passes through a liquid phase during pyrolysis and leaves a carbon residue is theoretically useable. Accordingly, the pre-cure times and temperatures may vary substantially depending upon the precurser used. For practical considerations, low volatility hydrocarbons are preferred. In the interest of brevity and clarity of illustration, the invention will be described herein with reference to the use of phenolic resins as the precurser as conventionally used in forming composite bodies. Therefore, the invention and the advantages thereof may be directly compared to conventional processes.

Similarly, a wide variety of carbon/carbon composite articles may be formed using conventional processes which basically employ forming a pre-shaped article with multiple plies of precurser-impregnated graphite fabric. Thus pre-cure, post-cure and pyrolysis times in such conventional processes may vary somewhat with the physical bulk of the shaped article, particularly when the shaped article comprises larger numbers of plies or layers of impregnated fabric. For the reasons stated above, the invention will be described herein with particular reference to its use in connection with forming a particular body so that direct comparisons may be made between the processes of the invention and conventional processes for forming similar articles. It will be readily appreciated, however, that the specific description is intended for illustrative and comparative purposes. The principles of the invention are equally applicable to forming other articles and the advantages thereof are proportionately dramatic.

In forming shaped carbon/carbon composite bodies, it is customary to form the desired body shape by superimposing a plurality of layers of graphite fabric on a form, jig or the like, the face of which conforms to the geometric form of the body to be produced. The face of the form is first covered with a suitable release material to insure that the formed body does not adhere to the form face and the fabric layers positioned thereon with the major fiber length of alternate layers disposed at approximately 90° from each other. For example, to form a ¼ inch thick panel, eighteen layers of a graphite cloth, such as that sold by Union Carbide Company under the trade designation T-300 fabric, would be used. This particular fabric is saturated with a suitable precurser in the as purchased condition. The precurser used in the T-300 fabric is commercially available from Fiberite Corporation of Winona, Minn. under the trade designation 640 phenolic resin. The resultant article is known in the trade as and will be referred to herein as a lay-up panel.

A layer of open weave fiberglass containing a release agent is placed over the exposed surface of the lay-up panel to permit escape of volatiles from the lay-up panel during heating. An absorbent pad, such as a plurality of layers of canvas or the like, is then placed over the fiberglass so that volatiles escaping from the lay-up panel may pass through the fiberglass and be absorped by the pad. Conventionally, the pad consists of two layers of canvas for each layer of saturated graphite fabric.

To convert the above-described lay-up panel to a carbon/carbon composite using conventional processes, the lay-up panel would be pre-cured by heating the lay-up panel and pad assembly under pressure in an inert environment. The assembly would be gradually heated from room temperature to about 300° F. at a rate of about 75° per hour. Thus the period for pre-cure would be approximately three hours. During this period entrapped water vapor and other volatile materials contained in the resin, such as formaldehyde, solvents, etc., are evaporated. If these volatile materials are evolved too rapidly, the vapors will form entrapped bubbles which expand rapidly and cause delamination and/or distortion of the lay-up panel. Furthermore, rapid heating tends to cause collection and concentration of liquid resin at the surface of the lay-up panel. Such liquid resin may prematurely cure to form a relatively impervious skin on the surface of the lay-up panel which inhibits further gas evolution and cause distortion of the panel and rupture of the panel surface.

After a temperature of about 300° F. is reached, the readily volatile impurities, such as water, etc., have been removed and the resin has reacted sufficiently to assume a solid or semi-solid plastic state. The resin in this state is termed "cured". Further heating ordinarily will not cause the cured resin to melt. Instead, when heated to higher temperatures, the cured precurser begins to decompose and relatively large quantities of gaseous by-products of the pyrolytic decomposition process are evolved. Since the cured body at this point is a porous solid, the temperature must be increased very slowly to permit the gases formed to migrate through the porous solid without rupturing the solid structure. Accordingly, in the conventional post-cure step, the temperature of the cured lay-up panel is increased at a very slow rate. Typically the temperature is increased from about 300° F. to about 500° F. over a period of seven days. Furthermore, during the long post-cure period the lay-up panel must be contained within extensive restraining fixtures to prevent warping and delamination of the panel.

After the panel has been post-cured to 500° F. it is cooled to room temperature. The panel, still in its restraint fixture, is packed in calcined coke maintained in a stainless steel retort. The calcined coke packing acts both as a temperature modifier and a restraining fixture to hold the post-cured panel during the final pyrolysis step. The panel is then heated to a temperature of about 1500° F. However, because of the thermal inertia of the coke and its container, the panel may not reach a temperature of 1500° F. for as long as seventy-two hours. Accordingly, the final pyrolysis step may take as long as ninety-six hours or longer.

It will be observed from the foregoing that the conventional process is quite time-consuming because of the great care which must be taken to permit gases to be evolved from the precurser during the pre-cure and post-cure steps while permitting the precurser to form a solid structure. In accordance with the invention, the pre-cure step is substantially modified to cause rapid evolution of gases from the precurser and simultaneously form an interconnecting pore network connecting the voids in the porous structure formed so that subsequent gas evolution may occur at much more rapid rates.

In accordance with the invention, the lay-up panel and absorbent pad assembly is placed in a flexible container, such as a mylar bag or the like, and the bag evacuated at room temperature to draw off part of the readily volatile materials and uniformly apply an external pressure of approximately one atmosphere to the lay-up panel. The assembly is then placed in a sealed autoclave and the pressure in the autoclave increased to about 30 to 35 psig (resulting in a pressure of about 45 psia being uniformly applied to the bag containing the lay-up panel) to densify the lay-up panel and to force resin into the fabric and between the fabric plies. The bag is then vented to the exterior of the autoclave and the workpiece rapidly heated to about 150° F. (or until the precurser is liquid and the curing reaction has begun). The pressure in the autoclave is then reduced to about 15 psig and the temperature rapidly increased to about 325° F. It has been discovered that by maintaining a relatively high external pressure on the workpiece during the initial pre-cure step, gases may be rapidly evolved from the lay-up panel without causing the precurser to foam and without permitting liquid resin to migrate to the surface of the panel to form a liquid layer thereon. Furthermore, by reducing the external pressure applied to the lay-up panel after the panel has reached a temperature of about 150° F. (while the precurser is still a liquid, semi-liquid or semi-gel) the voids formed in the precurser by gas evolution tend to form pores interconnecting the void structures.

While application of high external pressure helps prevent frothing and foaming of the precurser in the liquid stage, the reduction in pressure should occur when the precurser reaches the curing reaction temperature and begins to form a gel. Thus, when the pressure is reduced, gas forming small cavities in the gel structure is rapidly relieved and tends to form an interconnecting pore structure without structurally degrading the surrounding body. Since the precurser is in the reaction phase when the pressure is reduced, the pore structure formed by the release of pressure is retained as the temperature of the body is increased. Thus, since the body is porous and the pore structure is substantially interconnected, relatively rapid evolution of gas is permitted.

After the interconnected pore structure is formed, the body may be rapidly heated to evolve additional gases therefrom. Accordingly, the temperature of the body is increased to a temperature higher than the conventional pre-cure temperature. For example, in the conventional process described hereinabove, the lay-up panel would be heated to approximately 300° F. in the pre-cure step. In accordance with the present invention, however, the pre-cure heating step is continued until a temperature of about 25° greater than the conventional pre-cure temperature is achieved. In this case, the pre-cure temperature is raised to approximately 325° F.

It should be noted that during the entire pre-cure treatment process, the lay-up panel is subjected to an external pressure. In the preferred embodiment, the external pressure is initially about 45 psia and is reduced to about 30 psia when curing temperature is reached. Accordingly, even during the second phase of the pre-cure step, the body is maintained under an external pressure approximately one atmosphere greater than atmospheric pressure.

By maintaining the increased pressure on the lay-up panel during the second phase of the pre-cure step, gas may be rapidly evolved from the lay-up without rupturing the structure of the cured precurser being formed. It should be noted that the entire pre-cure phase using the process of the invention consumes only about two hours and occurs in one heating operation in single autoclave. Therefore, vast time savings are realized since the body need not be cooled after the initial pre-cure step to be placed in a post-cure oven. Furthermore, the energy lost by cooling the body after pre-cure and reheating the body in the post-cure step is conserved. Since the total pre-cure step using the process of the invention is only about two hours, a time saving of about seven days is realized.

Not only is a vast saving in time and heating energy realized using the process of the invention, the pore structure formed using the process of the invention is more fine-grained than the pore structure formed by conventional processes. Thus the pyrolytic carbon matrix ultimately produced is a more fine-grained and harder structure.

Because of the interconnecting pore structure formed during the pre-cure step of the invention, rapid gas evolution is permitted and the cured lay-up panel produced thereby may be heated to pyrolysis temperatures quite rapidly without fear of rupturing the cured body. Accordingly, the product produced in the two-phase pre-cure step is transferred directly from the curing autoclave to a carbonizing furnace. However, instead of packing the cured body in a container of coke, the body may be positioned in an oven surrounded only by an inert gaseous environment. Accordingly, the cured body may be heated directly to carbonizing temperatures without the use of calcined coke packing. Since the cured body is the only material being heated during the pyrolysis step, the temperature thereof may be increased much more rapidly to reach the final carbonization temperature and much less heating energy is consumed. Using the process described, the cured body may be heated to the pyrolysis temperature of 1500° F. in about two hours. Such rapid heating to pyrolysis temperature is possible because the body is heated in an inert gas and the energy required to heat the calcined coke packing (as in the conventional process) is not necessary. Furthermore, because of the interconnected pore structure of the cured body, rapid gas escape during this period is possible without causing damage to the structural integrity of the body.

From the foregoing it will be observed that the pyrolysis step of the process is reduced from about four days to about four hours using the process of the invention. Furthermore, because the pore structure of the final body is interconnected and fine-grained, a harder matrix structure is produced.

Densification of the initial body produced may be accomplished by pyrolysis of additional precurser in the pore structure of the initial body. In the preferred densification process, the porous body is placed in an enclosed chamber which is then evacuated. The evacuated chamber is then back-filled with the same precurser (640 phenolic resin) initially used and the pressure in the enclosed chamber raised to about 80 psig to impregnate the pores with precurser. The re-impregnated body is then heated to about 325° F. in an inert gas under a pressure of about 80 psig. The flexible bag and retaining fixtures are not required in the densification operation since the body is already a hard, rigid composite body. The pre-cured re-impregnated body is then transferred directly to the pyrolysis furnace and the pyrolysis step repeated. It will be realized that since the post-cure step has been eliminated from the densification process, and since the pre-cured re-impregnated body may be heated directly from room temperature to 1500° F. in a gas, the time period required for the densification step is likewise dramatically shortened. Therefore, multiple densification steps may be preformed without expending inordinate periods of time and at much less expense. Furthermore, since the pore structure of the initial composite body formed is substantially interconnected, liquid precurser added during the densification process fills more void space, thus denser bodies are ultimately produced. Using the process of the invention as described hereinabove, carbon/carbon composite bodies with specific gravities of 1.56 may be produced which exhibit flexure strengths of about 30,000 psi and tensile strengths of 35,000 psi.

From the foregoing it will be observed that by using the process of the invention, amorphous carbon-reinforced graphite bodies may be produced in a matter of hours as contrasted to time periods measured in terms of days using conventional processes. Not only is the time period required for making the initial body substantially reduced, but the densification process is likewise dramatically abbreviated. Therefore, multiple densification steps may be repeated in a matter of mere hours instead of the weeks required using conventional processes. As a result, denser bodies may be formed at a fraction of the cost of less dense bodies formed by prior processes. Furthermore, because of the interconnected pore structure resulting from the process of the invention, the final product is a more fine-grained and harder amorphous carbon matrix.

While the invention has been described with particular reference to composite bodies formed by pyrolysis of carbonizable liquids in a graphite fabric, it will be readily recognized that the invention is not so limited. The multi-phase pre-cure step may be used, for example, in curing carbonizable liquids in other supporting forms to form cured bodies with interconnected pore structures, thus permitting similarly rapid cure and pyrolysis steps. Therefore, while the invention has been described with particular reference to specific embodiments thereof, it is to be understood that the forms of the invention shown and described in detail are to be taken as preferred embodiments thereof. Various changes and modifications may be resorted to without departing from the spirit and scope of the appended claims.

I claim:

1. The method of making a carbon/carbon composite structure, comprising the steps of:
   (a) fabricating a pre-form body of the desired configuration from a graphite fabric impregnated with a carbonizable fluid comprising a phenolic resin;
   (b) enclosing the pre-form body in a flexible bag;
   (c) reducing the pressure within said flexible bag to a pressure less than atmospheric;
   (d) enclosing said flexible bag in an enclosed containers
   (e) forming a pressure within said enclosed container of about 45 psia;
   (f) venting said flexible bag to atmosphere;
   (g) heating said pre-form body to a first temperature at which said carbonizable fluid is liquid and begins to cure while maintaining said pressure within said enclosed container at about 45 psia; and
   (h) thereafter reducing the pressure within said enclosed container to a pressure of at least about 30 psia and heating said pre-form body to a second temperature greater than the curing temperature of said carbonizable fluid.

2. The method set forth in claim 1 wherein said first temperature is about 150° F. and said second temperature is about 325° F.

3. The method set forth in claim 1 including the additional step of rapidly heating said body to a third temperature of about 1500° F.

4. The method set forth in claim 3 wherein said pre-form body is heated to said third temperature in an inert gaseous environment at substantially atmospheric pressure.

5. The method set forth in claim 3 including the additional step of immersing said body in a carbonizable fluid under pressure to impregnate the pores of said body with said carbonizable fluid and thereafter directly reheating said body impregnated with said carbonizable fluid to said second temperature.

6. The method set forth in claim 5 wherein said body is re-heated to said second temperature in an inert gas environment under a pressure of about 80 psig.

7. In the method of forming a carbon-reinforced composite structure wherein a porous carbon body containing carbonizable fluid, comprising a phenolic resin, is heated to pyrolyze said carbonizable fluid and form amorphous carbon, the improvement comprising the steps of:
   (a) heating said porous carbon body containing carbonizable fluid to the curing temperature of said carbonizable fluid in an inert environment under a first substantial pressure;
   (b) reducing said pressure to a second pressure still greater than atmospheric while said carbonizable fluid is still liquid; and
   (c) heating said porous body to a second temperature in excess of said curing temperature while maintaining said pressure greater than atmospheric.

8. The improvement set forth in claim 7 wherein said first substantial pressure is about 45 psia and said second pressure is about 30 psia.

9. The improvement set forth in claim 7 wherein said curing temperature is about 150° F. and said second temperature is about 325° F.

10. The method of forming a substantially interconnected pore structure in a body of amorphous carbon comprising the steps of:
   (a) heating a carbonizable precursor, comprising a phenolic resin, under a first substantial pressure to a first temperature approximating the curing reaction temperature of said carbonizable precursor;
   (b) reducing said pressure to a second pressure greater than atmospheric while said carbonizable precursor is still substantially liquid; and
   (c) heating said carbonizable precursor to a second temperature in excess of said curing reaction temperature.

11. The method of making a carbon/carbon composite structure comprising the steps of:
   (a) fabricating a pre-form body of the desired configuration from a graphite fabric impregnated with a carbonizable fluid, the carbonizable fluid comprising an organic resin, derived from a low volatility hydrocarbon which passes, successively, through liquid, gelatinous, and solid states during heat curing;
   (b) enclosing the pre-form body in a flexible bag;
   (c) reducing the pressure within said flexible bag to a pressure less than atmospheric;
   (d) enclosing said flexible bag in an enclosed container;

(e) forming a pressure within said enclosed container of about 45 psia;
(f) venting said flexible bag to atmosphere;
(g) heating said pre-form body to a first temperature at which said carbonizable fluid is liquid and begins to cure while maintaining said pressure within said enclosed container at about 45 psia; and
(h) thereafter reducing the pressure within said enclosed container to a pressure of at least about 30 psia and heating said pre-form body to a second temperature greater than the curing temperature of said carbonizable fluid.

12. The method set forth in claim 11 wherein said carbonizable fluid is a phenolic resin.

13. The method set forth in claim 11 wherein said first temperature is about 150° F. and said second temperature is about 325° F.

14. The method set forth in claim 11 including the additional step of rapidly heating said body to a third temperature of about 1500° F.

15. The method set forth in claim 14 wherein said pre-form body is heated to said third temperature in an inert gaseous environment at substantially atmospheric pressure.

16. The method set forth in claim 14 including the additional step of immersing said body in a carbonizable fluid under pressure to impregnate the pores of said body with said carbonizable fluid and thereafter directly reheating said body impregnated with said carbonizable fluid to said second temperature.

17. The method set forth in claim 16 wherein said body is re-heated to said second temperature in an inert gas environment under a pressure of about 80 psig.

18. In the method of forming a carbon-reinforced composite structure wherein a porous carbon body containing carbonizable fluid is heated to pyrolyze said carbonizable fluid and form amorphous carbon, the carbonizable fluid comprising an organic resin, derived from a low volatility hydrocarbon, which passes, successively, through liquid, gelatinous, and solid states during heat curing, the improvement comprising the steps of:
(a) heating said porous carbon body containing carbonizable fluid to the curing temperature of said carbonizable fluid in an inert environment under a first substantial pressure;
(b) reducing said pressure to a second pressure still greater than atmospheric while said carbonizable fluid is still liquid; and
(c) heating said porous body to a seocnd temperature in excess of said curing temperature while maintaining said pressure greater than atmospheric.

19. The improvement set forth in claim 18 wherein said first substantial pressure is about 45 psia and said second pressure is about 30 psia.

20. The improvement set forth in claim 18 wherein said curing temperature is about 150° F. and said second temperature is about 325° F.

21. The method of forming a substantially interconnected pore structure in a body of amorphous carbon comprising the steps of:
(a) heating a carbonizable precursor, comprising an organic resin derived from a low volatility hydrocarbon, which passes, successively, through liquid, gelatinous, and solid states during heat curing, under a first substantial pressure to a first temperature approximating the curing reaction temperature of said carbonizable precursor;
(b) reducing said pressure to a second pressure greater than atmospheric while said carbonizable precursor is still substantially liquid; and
(c) heating said carbonizable precursor to a second temperature in excess of said curing reaction temperature.

* * * * *